Oct. 14, 1952     R. T. EVANS ET AL     2,613,491
HORIZONTALLY HINGED WHEELED DISK HARROW
Filed April 22, 1946     4 Sheets-Sheet 1
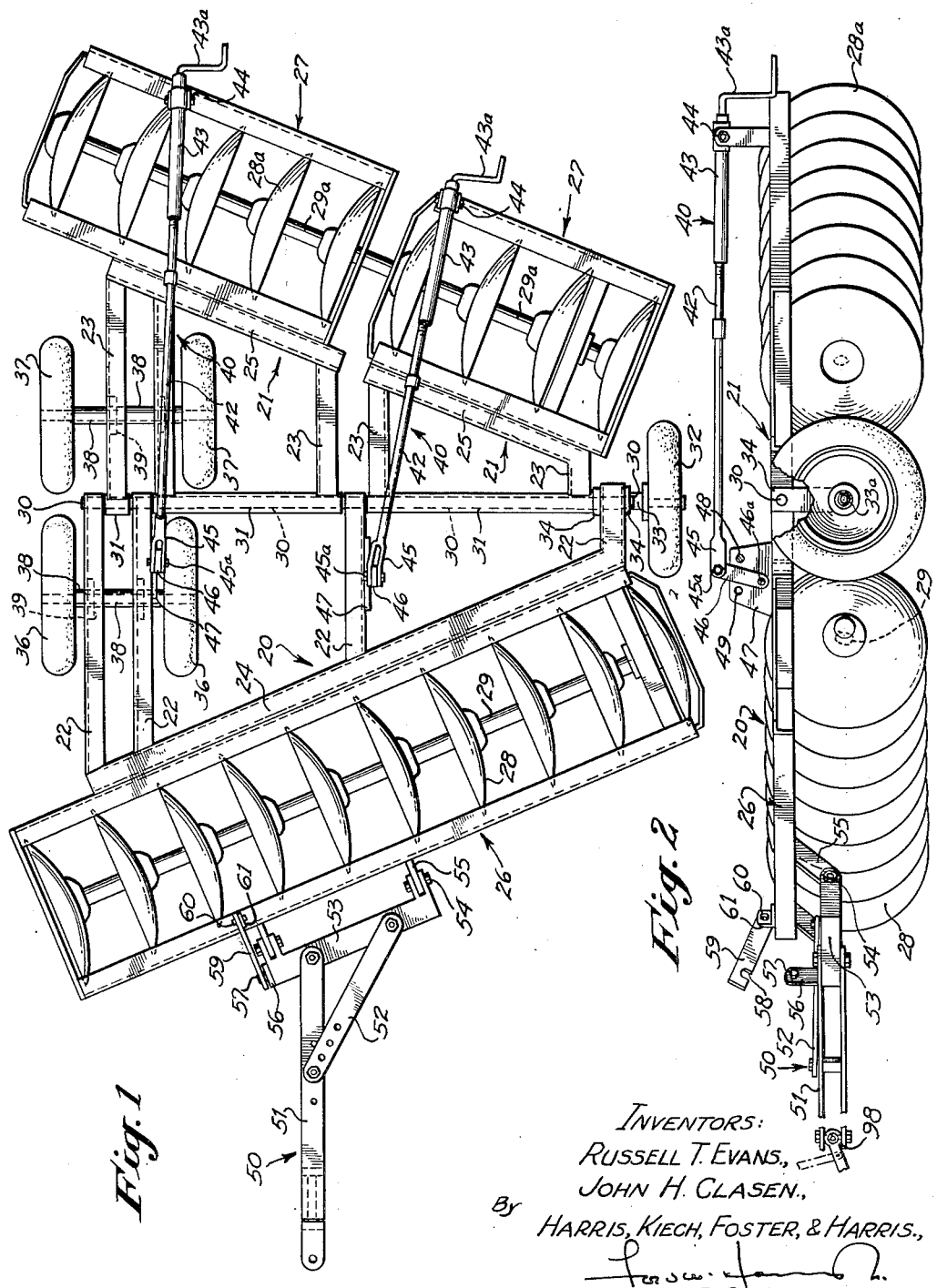
INVENTORS:
RUSSELL T. EVANS,
JOHN H. CLASEN,
By HARRIS, KIECH, FOSTER, & HARRIS,
FOR THE FIRM
ATTORNEYS

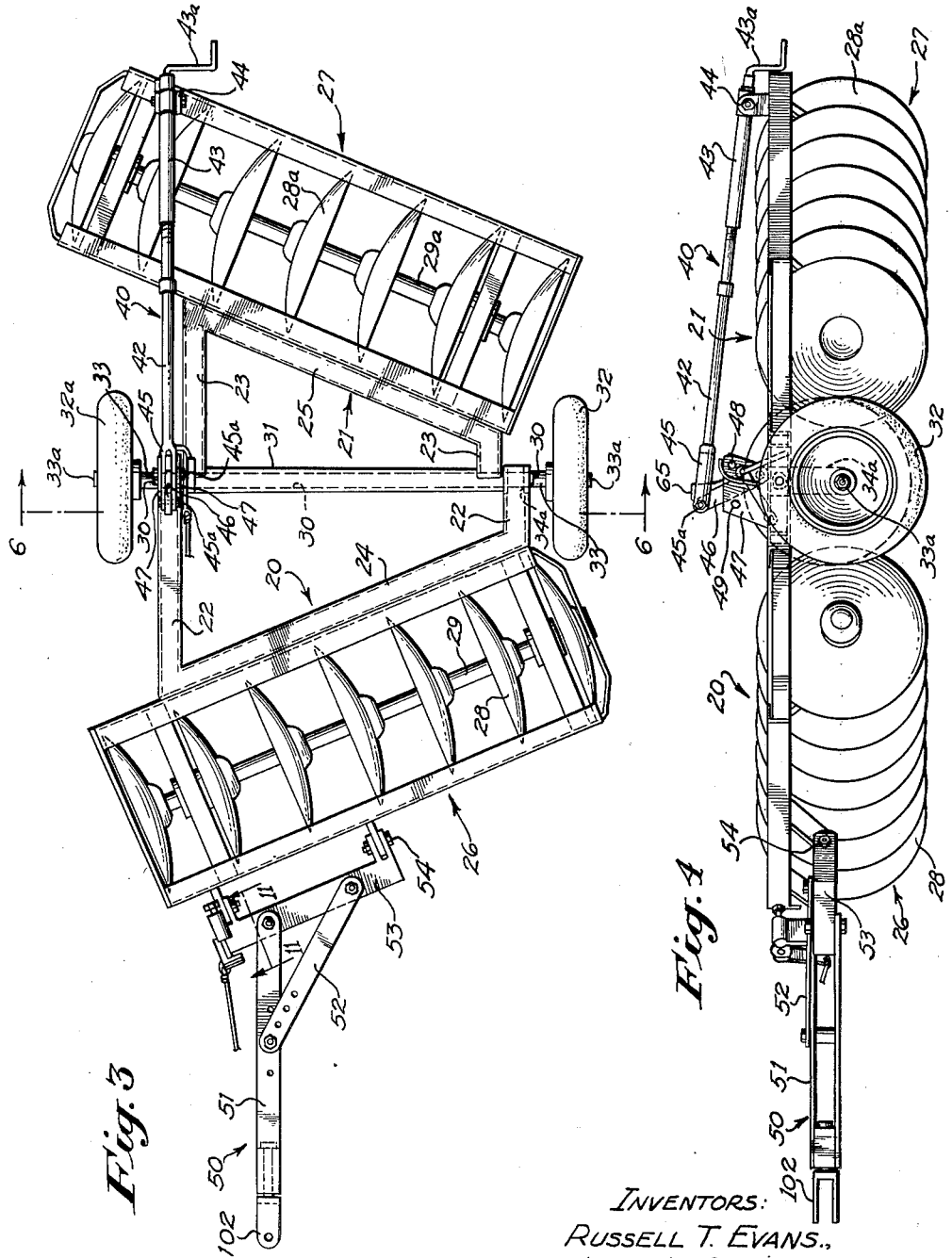

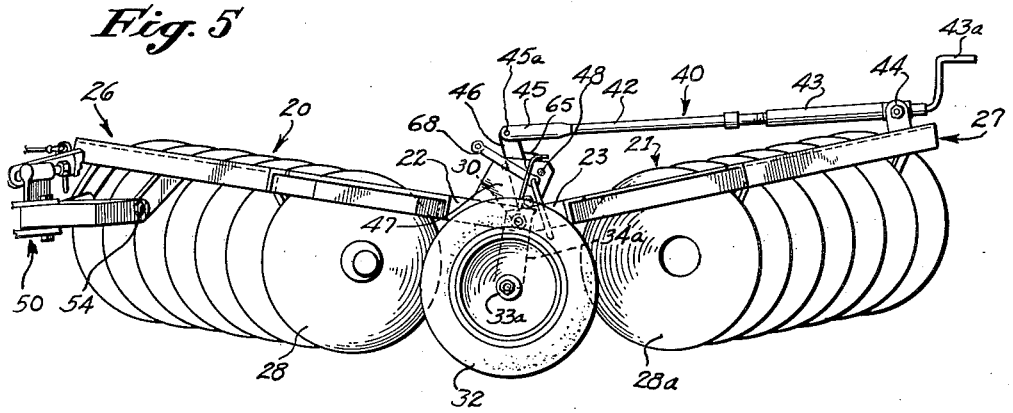
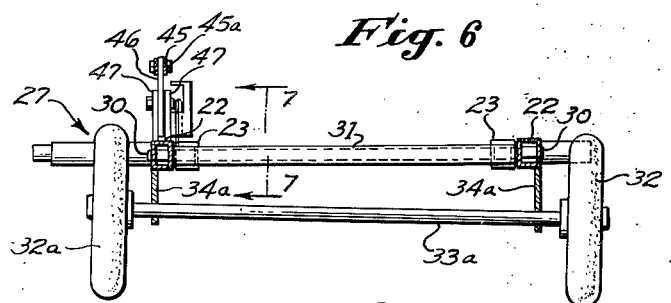
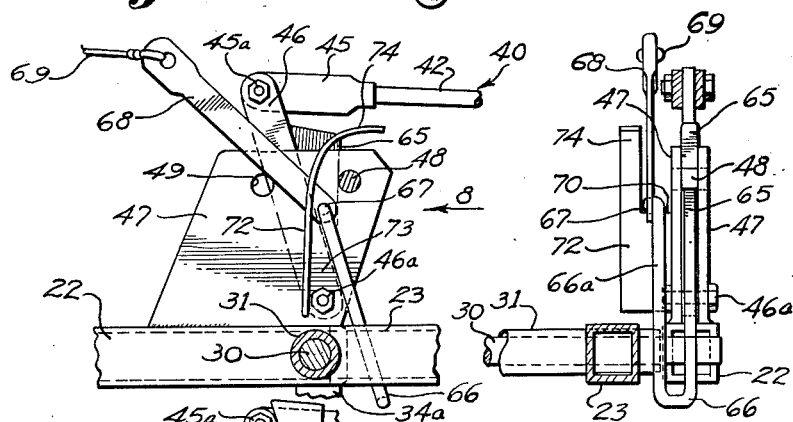
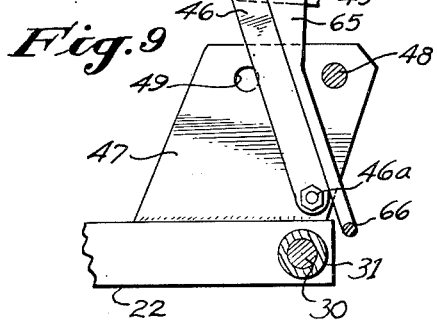
INVENTORS:
RUSSELL T. EVANS,
JOHN H. CLASEN,
By HARRIS, KIECH, FOSTER & HARRIS,
FOR THE FIRM
ATTORNEYS

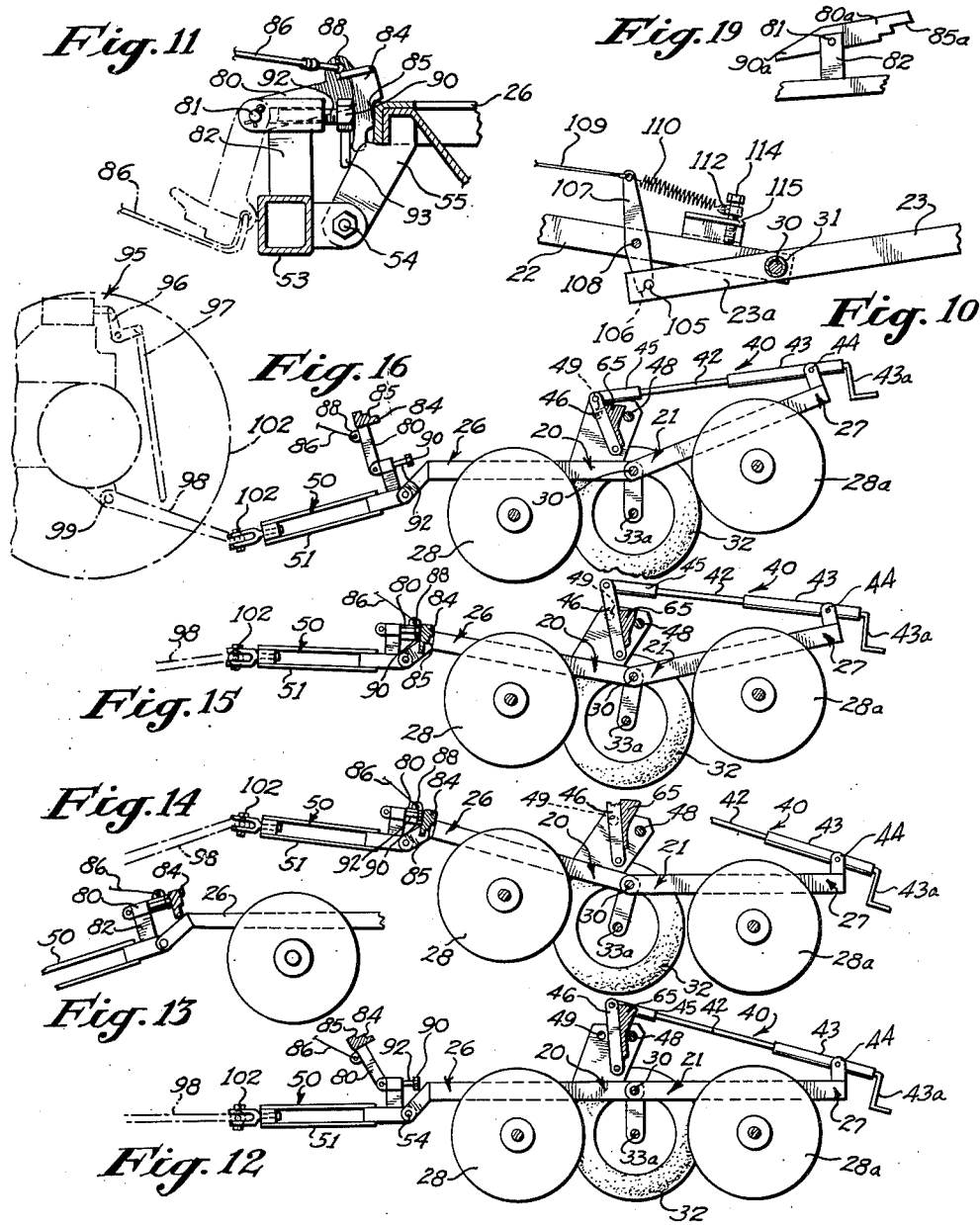

Patented Oct. 14, 1952

2,613,491

UNITED STATES PATENT OFFICE 2,613,491

HORIZONTALLY HINGED WHEELED DISK HARROW

Russell T. Evans and John H. Clasen, Anaheim, Calif.

Application April 22, 1946, Serial No. 663,926

25 Claims. (Cl. 55—73)

This invention relates to earth-working tools, and has special reference to harrows or plows of the offset disc type.

The general object of the invention is to provide for improved cultivation and to simplify discing operations as well as to simplify harrow construction. In connection with discing operations, it is a particular object of the invention to provide for easy and efficient regulation of the penetration of the soil by the discs regardless of the nature of the soil being cultivated. It is also an object, in connection with earth-working, to provide relatively simple means for conveniently adjusting the parts of discing tools to accomplish the desired penetration of the earth.

With respect to implement construction, a more specific object is to provide tools of the disc harrow or disc plow type constructed of fewer parts than is done in conventional practice, and thereby reduce both the cost and the time required to assemble the devices.

A particular structural feature of the invention is the provision of a transversely extending hinge by means of which the usual forward and rearward gangs of discs are pivotally connected together in order that one gang may move independently of the other gang when desired. In connection with this structural feature, means may also be provided whereby the two gangs may be moved about the axis of the hinge whereby to arrange the parts for easy transportation. For this purpose, wheels are provided at opposite sides of the framework and generally aligned vertically with respect to the hinge axis in order that, when the gangs are suitably positioned, the weight of the harrow will be entirely cast upon the wheels. Such a hinged, wheeled structure also provides for ready regulation of the depth of the cut effected by the discs of the two gangs, and the means by which the two gangs are adjusted with respect to each other may also be relied upon for the purpose of transferring more or less of the weight of the discs to the wheels so that the weight of the discs is applied to the wheels and consequently the depth of penetration of the discs may be properly adjusted as soil conditions vary.

A further object and feature of the invention is to provide means such that the forward gang of discs may be elevated automatically whereby especially to lift the most forward discs of the forward gang for the purpose of making right turns during cultivating operations.

Other objects and features of the invention will become apparent to those skilled in the art upon reference to the following specification and accompanying drawings in which certain embodiments are disclosed by way of illustration.

In the drawings:

Fig. 1 is a plan view of one form of hinged disc harrow or disc plow, employing a single wheel on the converging side or furrow side, usually referred to as the left side, two wheels being provided at the opposite or land side, usually referred to as the right side;

Fig. 2 is a side elevation of the structure of Fig. 1, taken from the left side of the apparatus;

Fig. 3 is a plan view of a somewhat modified form of the construction employing a left wheel and a single right wheel;

Fig. 4 is a side elevation taken from the left side of Fig. 3;

Fig. 5 is an elevational view corresponding generally with that of Fig. 4 and showing the relative position of the forward and rearward gangs of discs in transport position;

Fig. 6 is a transverse sectional view taken approximately on the line 6—6 of Fig. 3 for the purpose of showing both constructional features and the relative positioning of the land side wheel with respect to the main framework and the furrow side wheel whereby to insure proper relative positioning of land side and furrow side discs;

Fig. 7 is an enlarged, fragmentary, longitudinal, vertical detail taken on the line 7—7 of Fig. 6;

Fig. 8 is an elevational detail of the parts shown in Fig. 7 and taken at right angles to the view in Fig. 7 as indicated by the arrow 8 thereof;

Fig. 9 is a view similar to that of Fig. 7 but taken on an intermediate plane to indicate the relation of the parts in a different position;

Fig. 10 is a detail of a modification for retaining the gangs of discs in transport or similar relationship;

Fig. 11 is a fragmentary detail, principally in elevation, of a latch mechanism used in conjunction with the tractor hitch at the front of the harrow, as indicated by the line 11—11 of Fig. 3;

Figs. 12 to 16 are diagrammatic side elevational views indicating various steps in the operations of shifting the parts from discing position to transport position, when using the structure of Figs. 3 to 9 and 11;

Fig. 17 is a fragmentary view showing a modified form of latch to replace that shown in Fig. 11; and Figs. 18 and 19 are fragmentary details of a lifting device for the forward corner of a discing implement of the present type.

In the form of construction shown in Figs. 1 and 2 of the drawings, a forward frame 20 and two rearward frames 21 are employed, and in the form of construction disclosed in Figs. 3 to 9, a forward frame 20 and one rearward frame 21 are employed. These frames 20 and 21 respectively comprise parallel longitudinally extending arms 22 and 23, the arms 22 of each frame 20 being fixedly secured at their forward ends to a forward rail 24, and the rearward ends of the arms 23 of each frame 21 being fixedly secured to a rearward rail 25. Each rail 24 has secured thereto, as by means of bolts, a forward conventional disc framework 26 carrying a forward gang of discs 28 conventionally mounted on a shaft 29. To each rearward rail 25 there is similarly attached a rearward disc framework 27 of conventional construction carrying a set of discs 28a conventionally mounted upon shafts 29a.

The arms 22 of each forward frame 20 are mounted upon a transverse shaft 30 which constitutes a hinge element also receiving spaced sleeves 31 to which the forward ends of the arms 23 of each rearward frame 21 are fixedly secured. By this construction, the respective frames 20 and 21, with their forward and rearward discs 28 and 28a, are mounted for vertical movement about the shaft 30 as a horizontal hinge axis.

In the structure of Figs. 1 and 2, the two sets of discs 28a on the two frameworks 27 constitute together a rearward gang of discs. This type of construction is adapted particularly for large disc harrows or plows because, in employing the present invention on such heavy implements, it is desirable to divide the rear load into two corresponding portions. Another feature of Figs. 1 and 2, not found in the form of the other figures, is a ground wheel arrangement now to be described.

Since, according to this invention, the load of the implement, or a portion of such load, is at times to be transferred to ground wheels, means is provided for carrying the structure upon such wheels when required. For this purpose, the structure of Figs. 1 and 2 includes a left furrow side wheel 32 mounted upon a stub axle 33 carried in the lower ends of a pair of depending brackets 34 welded to opposite side portions of the rear end of the adjacent arm 22 of the forward frame 20. At the right side or land side of the implement, either one, or preferably a pair each of forward ground wheels 36 and rearward ground wheels 37 are longitudinally aligned as close to the hinge point as possible, these wheels 36 and 37 being carried upon short axles 38 mounted in the lower ends of pairs of depending brackets 39 welded on the under sides of adjacent arms 22 and 23 respectively.

For the purpose of swinging the forward and rearward gangs of discs about the hinge axis provided by the shaft 30, adjustment screw devices 40 are employed. By these devices 40, the disc gangs may be caused to assume various positions with respect to each other such as illustrated in Figs. 5 and 12 to 16 in connection with the other form of implement. Each of these screw devices comprises a rod 42 threaded at its rearward end for reception in an internally threaded sleeve 43 actuable through a hand crank 43a. Each sleeve 43 is conventionally mounted in a bracket 44 secured upon the rearmost rail of the respective frame 27 carrying discs 28a of the rearward gang. Each rod 42 has its forward end provided with a clevis 45 pivotally connected at 45a with the upper end of a control lever 46 whose lower end is pivoted on a pivot bolt 46a carried in a pair of spaced upstanding brackets 47 welded to the upper portions of corresponding arms 22 of the frame 20. The control lever 46 is disposed between and thus guided by the brackets 47. Positioned in the upper portions of the brackets 47 above the pivot bolt 46a is a stop pin 48 located behind the control lever 46. With this structure, operation of the crank 43a to shorten the respective adjustment device 40 causes the control lever 46 to bear against the stop pin 48 so that the forward and rearward gangs of discs will be elevated with respect to the ground wheels 32, 36 and 37, thereby transferring more or less of the load to these wheels. Such transfer of load may be either for the purpose of reducing the penetration of the discs 28 and 28a into the soil, or for the purpose of shifting all of the weight to the ground wheels in order to transport the implement along a road or from field to field. In order that the adjustment devices 40 may be employed as a means to maintain the frames 20 and 21 and their respective gangs of discs in rigid relationship, holes 49 are provided in the upper forward portions of the upstanding brackets 47 in such position that when a bolt (not shown) is passed through the holes 49 it will engage the forward edge of the control lever 46 to hold the latter against the stop pin 48 and prevent relative movement of the control lever 46. It will be understood that when the holes 49 carry no bolt or other stop means the control lever 46 is free to move forward from the stop pin 48 and thereby permit relative rising movements of either of the gangs of discs so that the discs may rise and fall freely about the hinge provided by the shaft 30, whereby the movements of the discs may accommodate the contours of the earth being cultivated. However, when the control lever 46 strikes the stop pin 48, relative falling movement of the discs will be checked and their penetration into the soil correspondingly limited. Thus, by lengthening an adjustment device 40, soil penetration is increased, and the load may be entirely removed from the wheels if desired, whereas shortening reduces penetration, and all the load may be transferred to the wheels when required.

For the purpose of drawing the disc harrow, not only of the form in Figs. 1 and 2, but also the form of Figs. 3 to 9, a more or less conventional hitch 50 is employed, which comprises a tongue 51 having a brace bar 52 bolted thereupon at one end, the rearward end of the tongue 51 and the brace bar 52 being bolted to a drawbar 53, which is pivotally connected by pivot bolts 54 to depending bracket arms 55 welded to the front rail of the forward framework 26.

The hitch 50, in all forms of the invention, may have its pivotal movements about the pivot bolts 54 capable of control for the purpose of insuring required movements of the harrow structure when being placed in condition for transport. In the form of Figs. 1 and 2, the right end of the drawbar 53 is provided with an upstanding lug 56 having on one side a pin 57, the latter being adapted to be received in a notch 58 provided in the forward end of a latch arm 59 whose rearward end is pivotally mounted by means of a pivot bolt 60 upon a bracket 61 secured to the adjacent upper portion of the forward rail of the framework 26. When it is desired to operate normally with the harrow structure, the latch arm 59 is thrown backward into an inoperative position, but when it is desired to raise the frames 20 and 21 about the hinge axis provided by the transverse shaft 30, the latch arm 59 is lowered so that the notch 58 engages the pin 57 whereby to render the connection between the hitch 50 and the forward framework 26 relatively rigid. Thus, if the forward end of the tongue 51 is lifted in a conventional manner by an automatic power lift of a tractor, as presently to be described, that lifting motion may be imparted to the forward portion of the harrow instead of merely causing the tongue 51 and drawbar 53 to swing upon the pivot bolts 54. These operations will be similar to those employed in connection with the form of construction of Figs. 3 to 9, and will be described in conjunction therewith.

Referring especially to Figs. 3 to 6, showing the second form of construction, as above indicated the forward frame 20 and rearward frame 21 are connected through a hinged connection comprising the transverse shaft 30 and sleeve 31, the arms 22 of the frame 20 being mounted upon the shaft 30 and the arms 23 of the frame 21 being secured to the sleeve 31. With this form, only one rearward framework 27 is employed to carry the rear gang of discs 28a. This type represents a lighter construction provided with fewer discs and shorter frameworks. With such a structure, it is sufficient to employ only one right wheel or land side wheel 32a opposite the single furrow side wheel 32. These ground wheels 32 and 32a are mounted upon the opposite ends of a single axle 33a, which is carried in the lower ends of depending brackets 34a welded to the adjacent lower portions of the arms 22 of the forward frame 20, these brackets 34a thus being rigid with respect to the frame 20 and moving therewith. Preferably the bracket 34a adjacent the land side wheel 32a is somewhat shorter than the opposite bracket 34a so as to compensate for the additional thickness of earth over which the wheel 32a must travel. This relationship is illustrated in Fig. 6 and is a result of the workings of the various discs of the forward gang. This result arises from the fact that the furrow side ground wheel 32 follows immediately behind the outermost disc 28 at the left side of the forward gang and thereby travels in the bottom of a furrow and upon relatively hard soil, whereas a furrow formed by the disc at the extreme right of the forward gang is filled with earth thrown by the disc next to it. Thus, the land side, or right wheel 32a, travels on loose soil and at an appreciably higher elevation than the furrow side wheel 32, despite the fact that it may travel immediately behind the disc at the extreme right. Such accommodation for the wheel 32a permits the framework of the harrow as a whole to run on a more even keel and to insure proper leveling of the disced earth.

Figs. 3 to 9 also illustrate means by which the discs of the two gangs may be automatically elevated to transport position such as indicated in Fig. 5, a series of steps to accomplish this general position being illustrated in Figs. 12 to 16. The structure for accomplishing this end includes one of the same screw adjustment devices 40 as shown in Figs. 1 and 2. Here the upstanding brackets 47 are located close to the rear end of the respective frame arm 22, and the control lever 46 is carried between the brackets 47 upon the same pivot bolt 46a near the same stop pin 48 as in the other form. The distinguishing feature in this form of adjusting mechanism is found in a wedge 65 which is operable by the driver of a tractor from his seat and is movable vertically along the rear edge of the control lever 46 and within the space between the lever 46 and the stop pin 48.

The wedge 65 is adapted to be retained in an elevated position illustrated in Fig. 9 and to be lowered into a wedging position illustrated in Figs. 5 and 7. When the wedge 65 is in the elevated position of Fig. 9 and the screw adjustment device 40 is adjusted to a length such as illustrated in Fig. 4, so that the discs 28 and 28a may have normal rising and falling movements, the control lever 46 is free to move between the forward edge of the stop pin 48 and the most forward limit permitted by the length of the screw adjustment device. However, when the wedge 65 is lowered into the position shown in Figs. 5 and 6, where the control lever 46 is at the limit of movement permitted by the screw adjustment device 40, the frames 20 and 21 and the disc frameworks 26 and 27, are locked in a relatively rigid position. Again, when the screw adjustment device 40 is shortened, and the wedge 65 is moved into its lower position as indicated in Fig. 5, the angular relationship illustrated may be maintained, so that the implement may be transported from place to place on the ground wheels 32 and 32a.

In order to operate the wedge 65, it is provided with a preferably integral depending extension 66 which is in the form of a loop or U-bend adapted to pass around the rearward edge of one of the upstanding brackets 47. The upstanding free arm 66a on the outside of the respective bracket 47 has its upper extremity pivotally attached at 67 to the lower rearward end of an actuating lever 68 whose forward upper end receives a cable 69 leading to the driver's seat on a tractor by which the implement is drawn. The actuating lever 68 cooperates with a fulcrum 70 which is formed by the upper edge of a plate 72 fixed at the outer side of the respective bracket 47 in any suitable manner such as by welding to the side of the bracket 47 or by welding to the head 73 of the pivot bolt 46a. The latter form of mounting may be employed especially where it is desirable to adjust positioning of the fulcrum 70. Extending upward from the plate 72 is a positioning finger 74 which lies outside the actuating lever 68 and provides a guide defining a path of movement for the actuating lever 68 between the finger 74 and the adjacent bracket 47. When it is desired to raise the wedge from the position in Fig. 7 to that in Fig. 9 the driver of the tractor pulls upon the cable 69 thereby swinging the actuating lever 68 upon its fulcrum 70 so that the lower end of the lever 68 is raised and thereby elevates the loop extension 66 and the wedge 65. By releasing draft upon the cable 69 at a time when the control lever 46 is moved forward from the stop pin 48, the wedge 65 will drop by gravity from the position of Fig. 9 to the position of Figs. 5 and 7.

Should it be desired at any time to maintain the parts in a substantially rigid relationship during discing operations, as generally indicated in Fig. 4, the screw adjustment device 40 having been correspondingly set, releasing the wedge 65 will permit the same to fall during normal rising and falling movements of the discs until the wedge binds against the stop pin 48.

For the purpose of automatically arranging the parts of the implement so that they assume a transport position such as seen in Figs. 5, 15, and 16, a latch device, shown in detail in Fig. 11, is provided adjacent the right forward corner of the framework 26 carrying the forward gang of discs 28. This latch device includes a swinging arm 80 which is pivotally mounted at 81 upon a forward portion of an upstanding lug 82 secured to the right end of the drawbar 53 so that the movements of the lug 82 follow the movements of the hitch 50 and its tongue 51 about the pivot bolts 54. On the free end of the swinging arm 80 a head 84 is secured, this head being of stepped formation to provide a series of shouldered notches 85 which may engage with the extreme upper edge portion of the front side of the forward rail of the framework 26. The arm 80, when inoperative, may be swung forward into the dotted line position seen in Fig. 11 and as generally indicated in Fig. 12. It may also be moved rearward into the full line position of Fig. 11 or into the position shown in Figs. 13 to 16. The arm 80 is adapted to be moved from one position to another by means of a cable 86 secured to an eye 88 on one edge of the arm 80, which is its upper edge when in operative position. Obviously, a pull upon the cable 86 will remove the arm 80 from the full line position of Fig. 11, and a quick jerk upon the cable 86 will suffice to snap the arm 80 from the dotted line position to the full line position of Fig. 11. In addition to the swinging arm 80, the latch mechanism includes a limiting stop 90 which is in the form of the head of a bolt 92 threaded into the upper portion of the lug 82 and adapted to be adjusted by the medium of a handle 93 which normally depends as seen in Fig. 11. When the swinging latch arm 80 is in the dotted line position the stop 90 serves to limit the swinging movement of the tongue 51 with respect to the framework 26, inasmuch as the head 90 is aligned as to strike the forward face of the corresponding rail of the framework 26 when the head 84 of the latch arm 80 is withdrawn.

The above described latch mechanism, comprising the swinging latch arm 80 and its head 84, is employed for the purpose of automatically moving the various parts of the implement from the normal operating discing position shown in Fig. 12 to transport position as shown in Figs. 15 and 16. In accomplishing these movements a power lift mechanism 95 on a conventional form of tractor, such as that commonly known as the Ford-Ferguson tractor, the rearward portion of which is indicated in broken lines in Fig. 16, is used. This power lift mechanism 95 includes a power operated bell crank 96 under the control of the driver of the tractor. The bell crank 96 actuates a lifting link 97 connected to an intermediate portion of a lifting arm 98 whose forward end is pivoted at 99 to an adjacent portion of the body of the tractor and whose rearward end is attached by any appropriate pivotal draft connection 102 to the forward end of the tongue 51 of the hitch mechanism 50.

Of the series of operations indicated in Figs. 12 to 16, that of Fig. 12 represents the position of the parts for normal discing, where the forward discs 28 and the rearward discs 28a engage the soil to such a depth as may be desired and is insured through the adjustment of the screw adjustment mechanism 40. With the wedge 65 elevated, a longer adjustment of the screw mechanism 40 permits greater penetration of the earth by the discs, and a shorter adjustment serves to swing the frameworks 26 and 27 upward about the shaft 30 as a hinge point in order to throw greater load upon the ground wheels 32 and 32a and reduce the penetration of the soil by the discs 28 and 28a. Under any of these discing conditions, the implement is drawn forward by a straight pull from the tractor through the arm 98.

When it is desired to transfer all of the weight to the ground wheels for transport purposes, the power lift mechanism 95 is actuated to lower the rearward end of the lifting arm 98 about its pivot 99 whereby to lower the forward end of the tongue 51 as indicated in Fig. 13. This operation throws the lug 82 forward and increases the space between the top thereof and the adjacent rail of the framework 26. The swinging latch arm 80 and its latch head 84 are then swung from the dotted line position shown in Fig. 11 to the full line position shown in either Fig. 11 or Fig. 13. This may be accomplished through the jerking of the cable 86 by the driver of the tractor, or in any other manner. When the latch arm 80 and its head 84 assume this position, the power lift 95 is actuated to cause the lifting link 97 to raise the rearward end of the lifting arm 98 whereby to elevate the tongue 51 of the hitch 50. When the head 84 strikes the adjacent forward face of the corresponding rail of the framework 26, swinging movement of the tongue 51 about the pivot bolts 54 is checked. As a result, further elevation of the forward end of the tongue 51 produces elevation of the framework 26 by reason of the swinging of the forward frame 20 about the shaft 30. This position is illustrated in Fig. 14. At this stage of the operation the angular relationship between the frameworks 26 and 27 and the corresponding frames 20 and 21 is appreciable and the spacing between the control lever 46 and the stop in 48 is approximately the maximum for any given set of operating conditions. At this point, the tractor driver releases the cable 69 connected with the actuating lever 68 and the wedge 65, thereby permitting the wedge 65 to drop to fill the space between the control lever 46 and the stop pin 48, as seen in Figs. 15 and 16. It will be appreciated that in Figs. 12 to 16 the actuating connection to the lower edge of the wedge 65 has been omitted to facilitate illustration of the successive positions. The wedge 65 having been thus placed in wedging position, the lifting arm 98 of the power lift 95 is then lowered through the medium of the lifting link 97 whereby to permit the tongue 51 and the forward end of the disc implement to descend. This result is indicated in Fig. 16 and will occur because the forward end of the disc implement is heavier than the rearward end. The latch 80, 84 is then withdrawn, as in Fig. 15, and the lifting arm 98 is elevated to cause the discs 28 and 28a to assume a position with respect to the ground wheel 32 as illustrated in Fig. 15, in which condition the implement may be transported. The stop 90 (or the stop 90a) strikes the forward rail of the framework 26 so that the indicated lift of the framework 26 is effected.

For the purpose of restoring the parts to the discing position, the power lift 95 will be actuated to reverse the various operations just described, the wedge 65 being elevated from its wedging position by pulling the cable 69, so that the frameworks 26 and 27 return to their normal discing relationship shown in Fig. 12.

Instead of employing the particular latch arm 80, its head 84, and the stop 90 provided on the upper end of the lug 82, an arm 80a similar to the arm 80 may be used, as shown in Fig. 19, this arm being provided with notches 85a, the opposite end of the arm beyond the pivot 81 having an extension whose extremity 90a serves as a stop. When the arm 80a is moved to operative position the stop 90a is withdrawn, but this stop 90a is moved into position to limit extreme movements of the framework 26 when the arm 80a is withdrawn from operative position.

Instead of employing the latching mechanism shown in Fig. 11 and the wedge mechanism 65 shown in Figs. 5 to 9, a somewhat simplified construction shown in Fig. 10 may be used. Here one of the arms 23 may have an extension 23a projecting forwardly alongside an adjacent arm 22, the extension 23a having a stop in 105 adapted to engage in a notch 106 on the lower end of a retaining lever 107 which is fulcrumed upon the mentioned arm 22 by any appropriate pivoting means 108. The upper end of the lever 107 is under the control of a cable 109 leading to the seat of the driver of the tractor and also under the control of a return spring 110. Conveniently, the spring 110 is secured at one end to a lock nut 112 on a set screw 114 which is mounted in a bracket 115. The lower end of the set screw 114 serves as a stop to engage the upper edge of the extension 23a of the respective arm 23. By this means the amount of penetration of the discs 28 and 28a into the soil, and the amount of weight consequently imposed upon the ground wheels, may be regulated as required. When it is desired to lock the discs in elevated position so as to throw their entire weight upon the ground wheels, the lever 107 will be drawn by the cable 109 into the position of Fig. 10 to maintain this relationship. Placement of the respective frameworks in such a position of angularity may be accomplished in any manner desired.

In Figs. 17 and 18, a lifting device is shown which may be used with the latch mechanism of Fig. 11, or to some extent may be used in place thereof, and may also be used on the implement of Figs. 1 and 2. Its function is to lift the forward portion of the framework 26 so that the most forward discs 28, namely, those at the right side, will clear the soil when making a right turn. This device comprises a cam finger 120 fixed to the forward face of the front rail of the framework 26 and providing a forwardly and downwardly extending lower cam edge 121 which co-operates with an underlying swinging cam arm 122 of appreciable thickness. In the form illustrated, one end of this cam arm 122 is pivoted in an adjacent rearward portion of the tongue 51, and an intermediate portion bears upon the upper face of the adjacent end of the brace 52. A flexible device, such as a chain 124, is adjustably attached to the left side of a drawbar quadrant (not shown) commonly provided at the rear of a tractor, so that a right turn of the tractor causes draft on the chain 124. This draft pulls the free end of the arm 122 forward under the cam finger 120 and lifts the framework 26 from the tongue 51, which is meanwhile held up by the lifting link 97 of the power lift 95. When the front gang of discs 28 is in operative position, such movement of the cam arm 122 causes the foremost discs 28 to be elevated sufficiently to clear the earth when it is desired to make a right turn. If not so lifted, right turning is strongly resisted because of the direction of the concave or cupped sides of the discs 28.

*Operation*

The operation of the disc implements herein disclosed has been generally outlined in connection with the foregoing description of their construction. As previously stated, the forward and rearward frames 20 and 21, to which are secured the rearward and forward frameworks 26 and 27 carrying respectively the gangs of discs 28 and 28a, are mounted on the horizontal shaft 30 as a hinge axis. With a normal setting of the respective screw adjustment devices 40, the discs 28 and 28a, and their frames, may rise and fall in discing operations as may be necessary as harder and softer soil is encountered. More or less of the weight of the implement is thus transferred through the shaft 30 and arms 22 and 23 to the various ground wheels 32, 32a, 36 and 37. By inserting a bolt or pin into appropriate holes 49 in the upstanding brackets 47 and in front of the control lever 46, the frames may be held rigid with respect to each other in order to prevent rising and falling movements with respect to the ground wheels. Such a condition is indicated in Fig. 2 and may be accomplished with the form of Figs. 3 to 9 by inserting a bolt in the holes 49 and dropping the wedge 65 until the control lever 46 is wedged between such bolt and the stop pin 48. The screw adjustment devices 40 may then be set to provide whatever angularity is desired between the respective frames 20 and 21 and their disc supporting frameworks 26 and 27. By these means any desired penetration of the soil in accordance with different soil conditions may be assured.

Where longer and heavier implements are built, as illustrated in Figs. 1 and 2, the load on the right side is more evenly distributed and better balanced by employing the two ground wheels 36 and 37 than if one ground wheel were used in that location. Also, the extremes of rising and falling movements at the foremost and rearmost corners of the frameworks 26 and 27, respectively, are desirably reduced somewhat, the adjacent end of the shaft 30 falling and rising proportionately. With this heavier form, operations may also be better regulated by employing the two rearward frameworks 27 and their screw adjustment devices 40. When the devices 40 are to be shortened to raise the frames and place them in transport position, the latch arm 59 is lowered so that the notch 58 engages about the pin 57, whereby proper positioning is maintained by the hitch 50.

Similar results are accomplished with the form of implement of Figs. 3 to 9, the wedge 65 being raised and lowered by the cable 69 and actuating levers 68 in conjunction with the operation of the swinging latch arm 80 by the cable 86 (Figs. 11 to 16), as above described, to produce the various operations and attain the various positions illustrated diagrammatically in Figs. 13 to 16.

From the foregoing, it will be clear that we have produced discing implements having horizontal hinges by which discing operations may be regulated as required by the character of the soil, whereby to limit penetration in soft soil and to insure sufficient penetration in hard soil. Also, it will be apparent that, with these hinged structures, change to and from transport and discing positions may be readily accomplished, this being done automatically from the driver's seat when one of the forms of apparatus is employed.

In operating both forms, when the forward and rearward discs penetrate deeper into the soil, the right wheels rise relative to the discs at a faster rate than the left wheels. This is because of the greater hinge length or lever length between the discs at the right of the implement and the respective wheels, as compared with hinge or lever length between the left discs and the left wheels 32. These differing lengths are, of course, the result of the convergence of the two gangs of discs. The indicated differential wheel movements are a special advantage because of the higher riding of the right wheels on the loosened earth than that of the left wheels in the furrows made by their leading discs. Other advantages in the present construction are found in the absence of control shafts and of independently movable axles upon which the wheels are mounted in various prior structures.

Since many other variations of the generic invention herein disclosed will occur to those skilled in the art to which this invention pertains, it is intended to cover all such modifications as fall within the scope of the claims.

We claim as our invention:

1. An earth-working implement comprising in combination: a pair of horizontally disposed frames; horizontally disposed hinge means connecting said frames for vertical movement relative to each other; earth-working tools carried by said frames; ground wheels on said implement adjacent said hinge means and adapted to support varying portions of the load of said frames and tools; and means for varying the angularity of said frames with respect to each other and thereby varying the load imposed upon said ground wheels and the extent of penetration of said earth-working tools, said varying means including an extensible device connecting the two frames together to swing them about said hinge means to change their relative angularity.

2. A combination as in claim 1, said varying means permitting free rising movement of said frames to provide a smaller angle, and means to limit falling movement of said frames.

3. An earth-working implement comprising in combination: a pair of horizontally disposed frames; horizontally disposed hinge means connecting said frames for vertical movement relative to each other; earth-working tools carried by said frames; ground wheels on said implement adjacent said hinge means and adapted to support varying portions of the load of said frames and tools; and means for varying the angularity of said frames with respect to each other and thereby varying the load imposed upon said ground wheels and the extent of penetration of said earth-working tools, said angularity-varying means interconnecting said frames and being adjustable to various lengths, thereby to vary the angular relationship between said frames.

4. An agricultural implement comprising in combination: forward and rearward horizontally disposed frames; earth-working discs carried by both of said frames; ground wheels disposed at opposite sides of said frames and adapted to support varying portions of the load imposed by said frames and discs; a shaft upon which both of said frames are mounted to provide a hinge, said shaft being disposed transversely of the direction of travel of said implement; control means connecting said frames for control of their downward movements; means to limit said downward movements while permitting upward movements of said frames; means to vary the angular relationships of said frames; and means adapted to lock said control means with respect to said frames whereby to maintain said frames in an elevated angular relationship upon said shaft.

5. A combination according to claim 4 wherein said ground wheels are connected with said frames adjacent the opposite ends of said shaft.

6. An agricultural implement comprising in combination: forward and rearward horizontally disposed frames; earth-working discs carried by both of said frames; ground wheels disposed at opposite sides of said frames and adapted to support varying portions of the load imposed by said frames and discs; a shaft upon which both of said frames are mounted to provide a hinge, said shaft being disposed transversely of the direction of travel of said implement; hitch means connected with the forward portion of said forward frame; and shiftable means disposed between and cooperating with said hitch means and said forward frame to effect elevation of the forward portion of said forward frame whereby foremost discs on said forward frame will be caused to clear soil being disced.

7. A combination as in claim 6 wherein said shiftable means includes a pivoted latch member.

8. A combination as in claim 6 including a control means connecting said frames to control their rising and falling movements with respect to each other.

9. A combination as in claim 6 wherein said shiftable means includes a swing latch to effect a binding relationship between said hitch means and said forward frame and rock said implement upon said ground wheels.

10. A combination as in claim 6 wherein either one of said hitch means and said forward frame includes carrying means, said shiftable means being carried and positioned by said carrying means, and the other of said hitch means and said forward frame is provided with bearing means against which said shiftable means bears to rock said forward frame with respect to said ground wheels.

11. An earth-working implement comprising in combination: forward and rearward, substantially horizontal frames, said frames carrying earth-working discs and diverging toward one side of said implement; hinge means connecting said frames and extending transversely of the direction of travel of said implement; a supporting ground wheel disposed at the diverging side of said frames; a supporting ground wheel at the converging side of said frames; and actuating means for changing the angular relationship between said forward and rearward frames, such actuating means comprising connection means on one of said frames, connection means on the other of said frames, and adjusting means between and engaging said connection means for moving said connection means in opposite directions, thereby raising the front portion of the forward frame and the back portion of the rearward frame simultaneously about said hinge means.

12. A combination as in claim 11 wherein said wheels are attached adjacent opposite ends of said hinge means.

13. A combination as in claim 11 including axle means for said wheels, and means attached to one of said frames and carrying said axle means, the axes of said wheels being thereby fixed with respect to said one of said frames and being movable with respect to the other of said frames.

14. A combination as in claim 11 wherein there is a plurality of aligned ground wheels on said diverging side.

15. In combination in an earth-working implement: forward and rearward horizontally arranged frames; earth-working tools carried respectively by said frames; hinge means extending transversely of the direction of travel of said implement and hingedly connecting said frames together; axle means carried by said frames; ground wheels carried at opposite sides of said implement and on said axle means; and actuating means for changing the angular relationship between said forward and rearward frames, such actuating means comprising connection means on one of said frames, connection means on the other of said frames, and adjusting means between and engaging said connection means for moving said connection means in opposite directions, thereby raising the front portion of the forward frame and the back portion of the rearward frame simultaneously about said hinge means.

16. A combination as in claim 15 wherein said tools on the respective frames are arranged in diverging relationship.

17. A combination as in claim 15 wherein said axle means comprises a single axle extending in a vertical plane approximately parallel to the vertical plane of said hinge means, and said earth-working tools are concave discs.

18. In combination in an earth-working implement: forward and rearward horizontally arranged frames; angularly disposed earth-working discs carried respectively by said frames; a shaft means disposed transversely to the direction of travel of said implement and hingedly connecting said frames together; means for moving said frames to place the discs of both frames in the earth at the same time; depending arms at opposite sides of said implement; axle means positioned by said depending arms; and ground wheels carried by said axle means at opposite sides of said implement, one of said ground wheels traveling behind the corresponding disc and in the furrow cut thereby, and the ground wheel on the opposite side of the implement traveling upon loose earth turned by leading discs, the depending arm which positions the wheel traveling upon said turned earth being shorter than the opposite arm whereby to compensate for the thickness of said turned earth and maintain said frames substantially level transversely during discing operations.

19. In combination in an agricultural implement adapted to be drawn forward: forward and rearward, substantially horizontal frame members; horizontal hinge means extending transversely of the direction of travel and hingedly connecting said frame members; earth-working tools carried forward and rearward of said frame members, respectively; wheels carried at opposite sides of said frame members; and separate means fixing the axles of opposite wheels to and at different distances below one of said frame members, such means spacing the axis of one wheel a greater distance below said one frame than the spacing of the axis of the other wheel therebelow whereby, as said frame members work about said hinge means, rising and falling movements of one of said wheels with respect to tools on the same side of the implement take place at a faster rate than corresponding movements of the wheel at the opposite side.

20. A combination as in claim 19 wherein said tools and corresponding supporting portions of said frame members at the respective sides of the implement are positioned at different distances from the respective wheels.

21. A combination as in claim 19 wherein tools on the respective frame members are arranged in series which converge toward one another at one side of the implement, the tools on the diverging side of the implement being disposed at greater distances from a respective wheel than the spacing between the tools and a wheel on the converging side of the implement.

22. An agricultural implement comprising in combination: forward and rearward horizontally disposed frames; earth-working discs carried by both of said frames; ground wheels disposed at opposite sides of said frames and adapted to support varying portions of the load imposed by said frames and discs; a shaft upon which both of said frames are mounted to provide a hinge, said shaft being disposed transversely of the direction of travel of said implement; and a control means connecting said frames and including means for controlling the downward movements of said frames, means to limit said downward movements while permitting upward movements of said frames, and means adapted to lock said control means for said downward movements with respect to said frames whereby to maintain said frames in an elevated angular relationship upon said shaft, said control means for said downward movements including a swinging lever, stop means for said lever, and wedge means adapted to be moved to and from position between said swinging lever and said stop means to lock such control means for said downward movements in position.

23. A combination as in claim 22 including means to actuate said wedge means and adapted for operation from the driver's seat of a tractive vehicle by which said implement is drawn.

24. An agricultural implement comprising in combination: forward and rearward horizontally disposed frames; earth-working discs carried by both of said frames; ground wheels disposed at opposite sides of said frames and adapted to support varying portions of the load imposed by said frames and discs; a shaft upon which both of said frames are mounted to provide a hinge, said shaft being disposed transversely of the direction of travel of said implement; control means connecting said frames and including means for controlling the downward movements of said frames, means to limit said downward movements while permitting upward movements of said frames, and means adapted to lock said control means for said downward movements with respect to said frames whereby to maintain said frames in an elevated angular relationship upon said shaft; hitch means connected to the forward end of said forward frame; and means to control upward movement of said hitch means with respect to said forward frame, whereby movement of said hitch means will produce corresponding movement of said frames when said frames are held in said angular relationship by said lock means.

25. An earth-working implement comprising in combination: a pair of horizontally disposed frames; horizontally disposed hinge means connecting said frames for vertical movement relative to each other; earth-working tools carried by said frames; ground wheels on said implement adjacent said hinge means and adapted to support varying portions of the load of said frames and tools; and means for varying the angularity of said frames with respect to each other and thereby varying the load imposed upon said ground wheels and the extent of penetration of said earth-working tools, said means for varying said angularity comprising upstanding means on one of said frames, supporting means on the other of said frames, and interconnecting means between said upstanding means and said supporting means, said interconnecting means being variable as to effective length and adapted to be shortened as to effective length to lift the rear and front portions of said frames relative to each other, and adapted to be lengthened as to effective length to lower said rear and front portions of said frames with respect to each other, thereby changing the relative angularity between said frames.

RUSSELL T. EVANS.
JOHN H. CLASEN.

REFERENCES CITED

The following references are of record in the file of this patent:

UNITED STATES PATENTS

| Number | Name | Date |
|---|---|---|
| 106,539 | Blankenbeker | Aug. 23, 1870 |
| 1,126,054 | McKaig | Jan. 26, 1915 |
| 1,355,409 | Motte | Oct. 12, 1920 |
| 2,349,257 | Evans et al. | May 23, 1944 |

FOREIGN PATENTS

| Number | Country | Date |
|---|---|---|
| 324,289 | Germany | Aug. 25, 1920 |